(12) United States Patent
Wakabayashi et al.

(10) Patent No.: US 9,933,910 B2
(45) Date of Patent: Apr. 3, 2018

(54) INPUT DEVICE AND ELECTRONIC EQUIPMENT

(71) Applicant: Sony Computer Entertainment Inc., Tokyo (JP)

(72) Inventors: Minoru Wakabayashi, Tokyo (JP); Kenichiro Kodama, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 78 days.

(21) Appl. No.: 14/452,797

(22) Filed: Aug. 6, 2014

(65) Prior Publication Data
US 2015/0049054 A1    Feb. 19, 2015

(30) Foreign Application Priority Data

Aug. 19, 2013    (JP) .................................. 2013-169839

(51) Int. Cl.
*G06F 3/046*    (2006.01)
*G06F 3/041*    (2006.01)

(52) U.S. Cl.
CPC ............ *G06F 3/046* (2013.01); *G06F 3/0416* (2013.01); *G06F 2203/0339* (2013.01); *G06F 2203/04101* (2013.01)

(58) Field of Classification Search
CPC ................ H04B 7/0413; H04B 7/0805; G06F 2203/0339; G06F 2203/04101; G06F 3/0416; G06F 3/046; H04M 1/0202; H04M 2250/22
See application file for complete search history.

(56) References Cited

U.S. PATENT DOCUMENTS

| 8,284,165 | B2 | 10/2012 | Koshiyama |
| 8,976,144 | B2 | 3/2015 | Araki |
| 9,195,360 | B2* | 11/2015 | Lin ......................... G06F 3/046 |
| 9,231,293 | B2 | 1/2016 | Park |
| 9,270,320 | B2 | 2/2016 | Saito |
| 2001/0034222 | A1* | 10/2001 | Roustaei ............ H04N 1/00281 455/403 |
| 2007/0093282 | A1* | 4/2007 | Chang .................. H04B 7/0608 455/575.7 |

(Continued)

FOREIGN PATENT DOCUMENTS

| JP | H1136157 A | 5/1999 |
| JP | 2000286690 A | 10/2000 |

(Continued)

OTHER PUBLICATIONS

Office Action for corresponding JP Patent Application No. 2013-169839, 7 pages, dated May 9, 2017.

*Primary Examiner* — Amare Mengistu
*Assistant Examiner* — Gloryvid Figueroa-Gibson
(74) *Attorney, Agent, or Firm* — Matthew B. Dernier, Esq.

(57) ABSTRACT

Disclosed herein is electronic equipment having a wireless communication function. The electronic equipment includes: an antenna element arranged in such a manner that at least part of the antenna element overlaps an input area used as an input interface on an enclosure of the electronic equipment; a wireless section adapted to perform wireless communication using the antenna element; and an input detection section adapted to detect user input to the input area based on the state of the antenna element.

10 Claims, 10 Drawing Sheets

(56) References Cited

U.S. PATENT DOCUMENTS

| | | | |
|---|---|---|---|
| 2008/0122798 A1* | 5/2008 | Koshiyama | G06F 3/0412 345/173 |
| 2011/0148813 A1 | 6/2011 | Araki | |
| 2012/0329524 A1* | 12/2012 | Kent | G06F 3/044 455/566 |
| 2013/0029625 A1 | 1/2013 | Park | |
| 2013/0157586 A1 | 6/2013 | Saito | |
| 2013/0217342 A1* | 8/2013 | Abdul-Gaffoor | H03K 17/955 455/77 |
| 2013/0315076 A1* | 11/2013 | Zhao | H04B 7/082 370/252 |
| 2014/0099991 A1* | 4/2014 | Cheng | G06F 3/017 455/550.1 |
| 2014/0269977 A1* | 9/2014 | Yang | H04B 1/3838 375/295 |
| 2015/0029067 A1* | 1/2015 | Pang | H01Q 13/10 343/770 |
| 2015/0200447 A1* | 7/2015 | Tang | H01Q 1/243 343/720 |

FOREIGN PATENT DOCUMENTS

| | | |
|---|---|---|
| JP | 2002164774 A | 6/2002 |
| JP | 2003280815 A | 10/2003 |
| JP | 2005121541 A | 5/2005 |
| JP | 2005121542 A | 5/2005 |
| JP | 2005127849 A | 5/2005 |
| JP | 2005134236 A | 5/2005 |
| JP | 2005269090 A | 9/2005 |
| JP | 2008257386 A | 10/2008 |
| JP | 2009159556 A | 7/2009 |
| JP | 2010010957 A | 1/2010 |
| JP | 2013031150 A | 2/2013 |
| JP | 2013146046 A | 7/2013 |
| WO | 2010064351 A1 | 6/2010 |
| WO | 2010147708 A1 | 12/2010 |
| WO | 2013101106 A1 | 7/2013 |

* cited by examiner

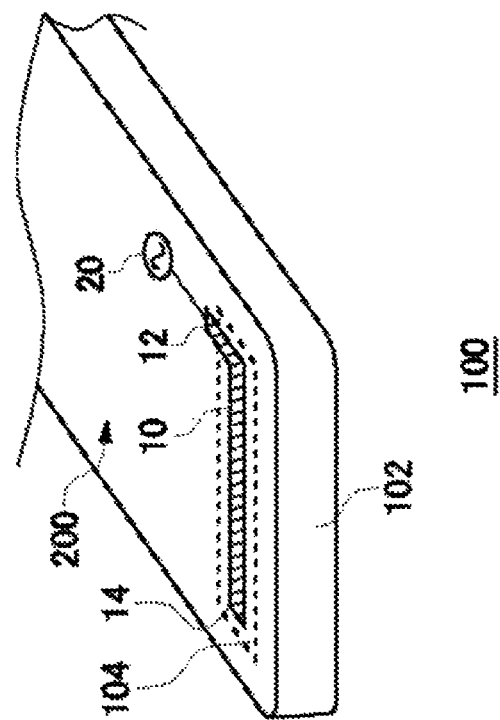
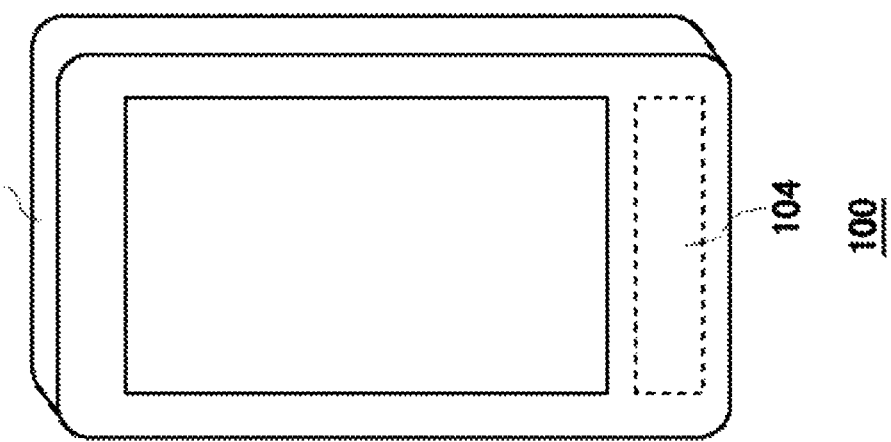

FIG. 8

| STATE | RSSI ANT1 | RSSI ANT2 | CHANGE | DETERMINATION USER INPUT | DETERMINATION DIVERSITY CONTROL | DESCRIPTION OF STATE |
|---|---|---|---|---|---|---|
| 1 | 100 | 100 | NO CHANGE | NO | ANT1 | INITIAL STATE |
| 2 | 120 | 100 | ANT1 IN GOOD CONDITION | NO | ANT1 | |
| 3 | 100 | 120 | ANT2 IN GOOD CONDITION | NO | ANT2 | |
| 4 | 50 | 50 | BOTH DECLINED IN RSSI | NO | ANT1 | AGGRAVATION OF WIRELESS ENVIRONMENT |
| 5 | 10 | 10 | BOTH DECLINED SIGNIFICANTLY IN RSSI | NO | ANT1 | OUTSIDE WIRELESS RANGE |
| 6 | 80 | 100 | ONLY ANT1 DECLINED IN RSSI | w | ANT2 | USER INPUT |
| 7 | 50 | 100 | ONLY ANT1 DECLINED IN RSSI | x | ANT2 | USER INPUT |
| 8 | 100 | 80 | ONLY ANT2 DECLINED IN RSSI | y | ANT1 | USER INPUT |
| 9 | 100 | 50 | ONLY ANT2 DECLINED IN RSSI | z | ANT1 | USER INPUT |
| 10 | 60 | 80 | BOTH DECLINED IN RSSI, WITH ANT1 SHOWING MORE DECLINE | w | ANT2 | AGGRAVATION OF WIRELESS ENVIRONMENT + USER INPUT |
| 11 | 30 | 80 | BOTH DECLINED IN RSSI, WITH ANT1 SHOWING MORE DECLINE | x | ANT2 | AGGRAVATION OF WIRELESS ENVIRONMENT + USER INPUT |
| 12 | 80 | 60 | BOTH DECLINED IN RSSI, WITH ANT2 SHOWING MORE DECLINE | y | ANT1 | AGGRAVATION OF WIRELESS ENVIRONMENT + USER INPUT |
| 13 | 80 | 30 | BOTH DECLINED IN RSSI, WITH ANT2 SHOWING MORE DECLINE | z | ANT1 | AGGRAVATION OF WIRELESS ENVIRONMENT + USER INPUT |

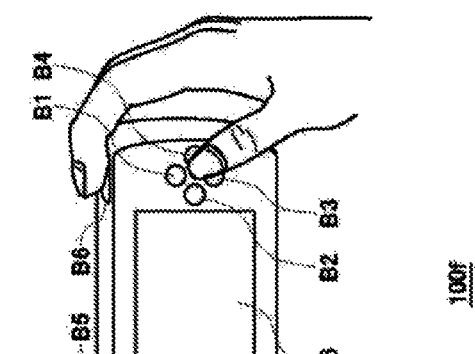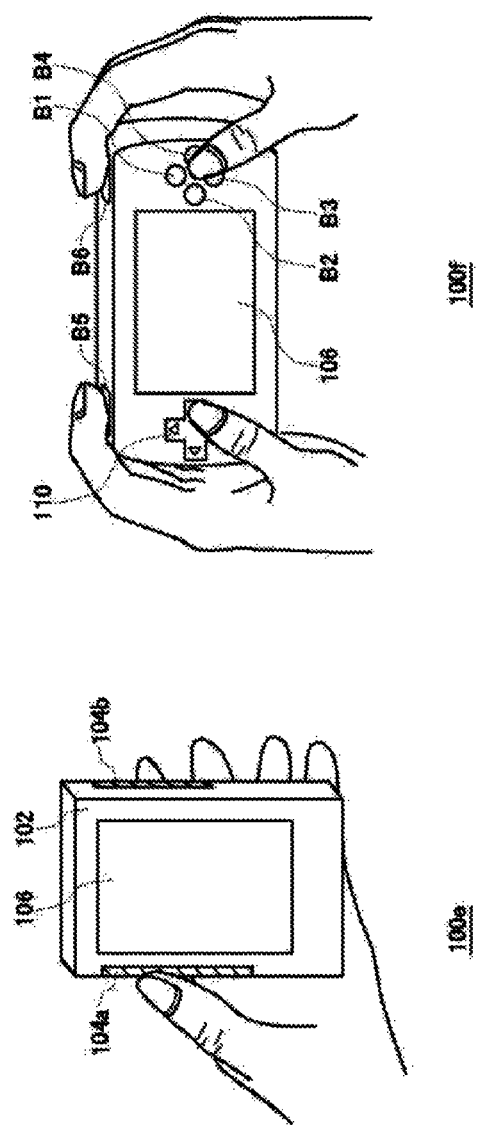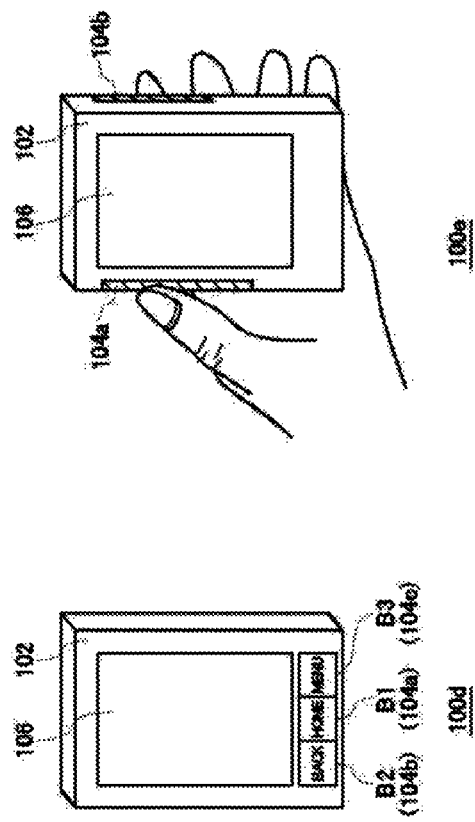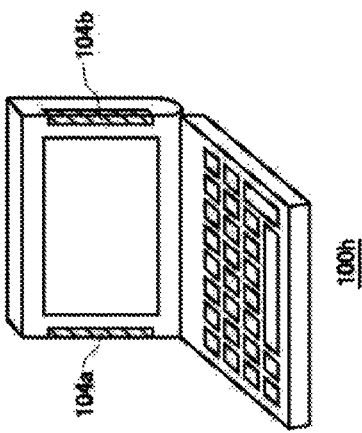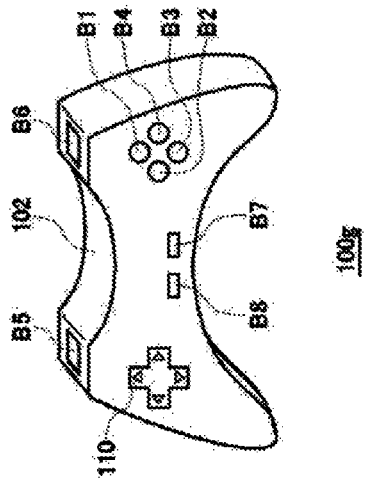

INPUT DEVICE AND ELECTRONIC EQUIPMENT

BACKGROUND

The present disclosure relates to electronic equipment, and more particularly, to a user interface thereof.

Touch sensors are widely used as one of user interfaces in electronic equipment such as smartphones, tablet terminals, and laptop computers in recent years. Resistive and capacitive touch sensors are mainstream.

A resistive touch sensor includes two metal thin films and a measurement section. The two metal thin films are stacked one on top of the other in a manner insulated from each other. The measurement section measures the composite resistance of the two metal thin films. This touch sensor relies on the change in composite resistance in response to the coordinates touched by the user.

A capacitive touch sensor includes a plurality of sensor electrodes and a measurement section adapted to measure the capacitance of each of the sensor electrodes. When the user's finger comes in proximity to one of the sensor electrodes, the capacitance formed by that sensor electrode changes. This touch sensor detects the coordinates touched by the user based on the relative change in capacitance formed by the plurality of sensor electrodes.

These touch sensors commonly include transparent electrodes and are arranged on a display panel, thus making up a touch panel.

In connection with the related art, the reader is requested to refer to U.S. Pat. No. 8,284,165.

SUMMARY

The present inventors have recognized the following problem under the above circumstances. In the above electronic equipment, there are cases in which buttons separate from the touch panel such as the power button, the sound volume adjustment button, and the home button are necessary.

In related art, it has been common to use mechanical switches as these buttons. However, mechanical switches are poor in long-term durability and do not offer desirable water tightness.

Alternatively, in related art, software buttons (also referred to as software keys) have been occasionally used. That is, button icons are shown on the display so that input to any of the buttons is detected using a touch panel. Software buttons are problematic in that part of the display area of the display is eroded.

The present disclosure has been made in light of the foregoing, and it is desirable to provide a technology capable of implementing an input device other than touch panel in electronic equipment having a wireless communication function.

According to an embodiment of the present disclosure, there is provided electronic equipment having a wireless communication function. The electronic equipment includes an antenna element, a wireless section, and an input detection section. The antenna element is arranged in such a manner that at least part thereof overlaps an input area on an enclosure of the electronic equipment. The input area is used as an input interface. The wireless section performs wireless communication using the antenna element. The input detection section detects user input to the input area based on the change in characteristic of the antenna element.

According to another embodiment of the present disclosure, there is provided an input device incorporated in electronic equipment having a wireless communication function. The input device includes: a communication antenna element arranged in such a manner that at least part of the antenna element overlaps an input area used as an input interface on an enclosure of the electronic equipment; and an input detection section adapted to detect user input to the input area based on the change in impedance as seen from a wireless section connected to the antenna element to the antenna element.

According to a further embodiment of the present disclosure, there is provided a user touch input detection method in electronic equipment having a wireless communication function. The user touch input detection method includes: arranging a communication antenna element in such a manner that at least part of the antenna element overlaps an input area used as an input interface on an enclosure of the electronic equipment; monitoring the impedance as seen from a wireless section connected to the antenna element to the antenna element; and detecting user input to the input area based on the change in the impedance.

It should be noted that any combinations of the above elements and any conversions of expressions of the present disclosure between "method," "device," "system," and so on are also effective as embodiments of the present disclosure.

The present disclosure allows for detection of user input using a wireless communication antenna.

BRIEF DESCRIPTION OF THE DRAWINGS

FIGS. 1A and 1B are perspective views of electronic equipment according to an embodiment of the present disclosure;

FIG. 8 is a diagram illustrating correspondence between RSSIs of electronic equipment having two antennas and determination results for diversity control and user input;

FIGS. 10A to 10E are diagrams illustrating modification examples of the electronic equipment.

DETAILED DESCRIPTION OF THE PREFERRED EMBODIMENTS

Figure 2:
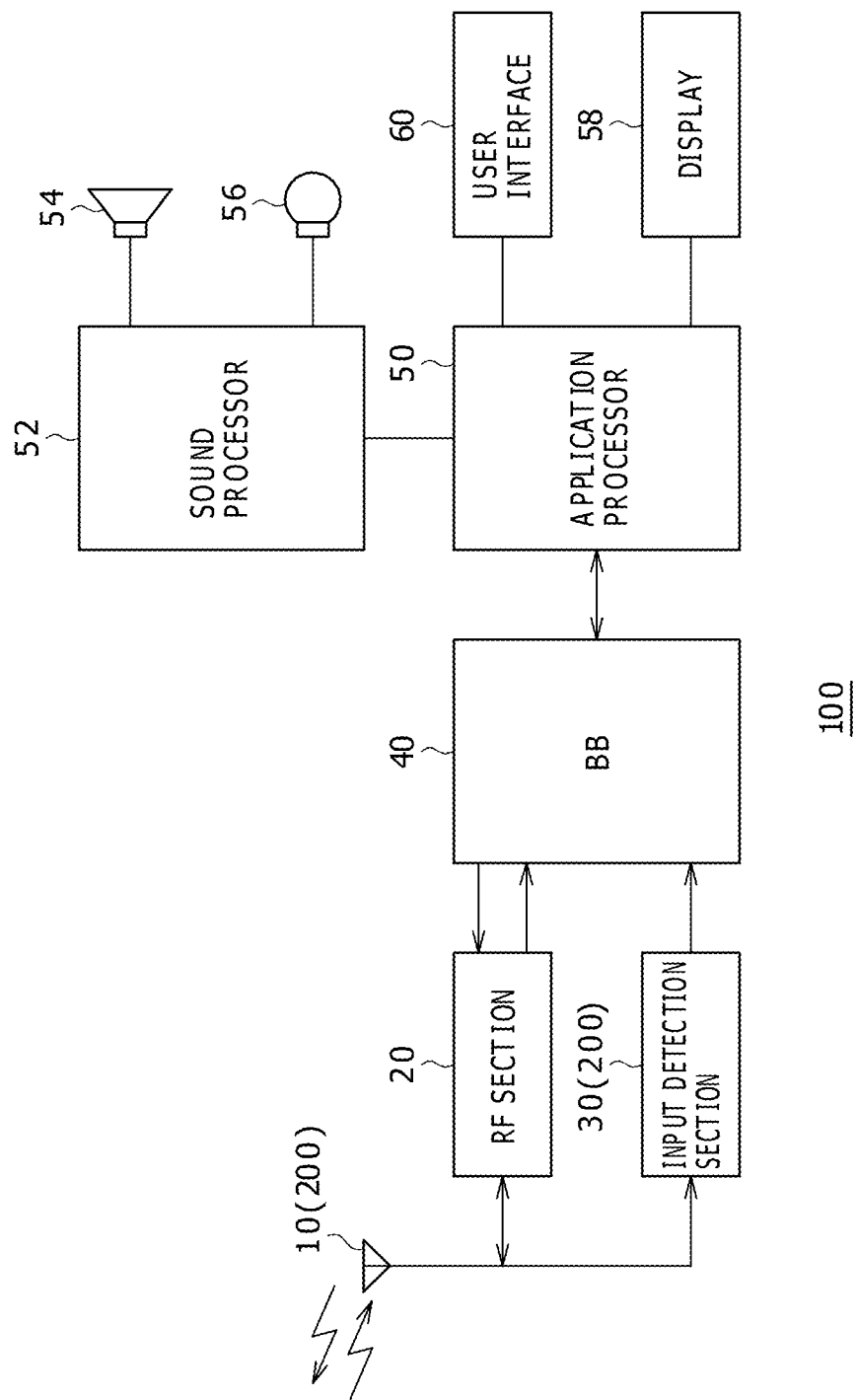
FIG. 2 is a block diagram illustrating the electronic equipment.

A description will be given below of preferred embodiments of the present disclosure with reference to the accompanying drawings. It should be noted that the same or like elements, members, and processes shown in the drawings will be denoted by the same reference symbols, and that redundant description will be omitted as appropriate. Further, the embodiments do not limit the disclosure but merely illustrate the same. All the features and their combinations described in the embodiments are not necessarily essential to the disclosure.

(Basic Configuration)

FIGS. 1A and 1B are perspective views of electronic equipment 100 having a touch input device 200 according to an embodiment. The electronic equipment 100 is a mobile phone terminal, a tablet terminal, a portable audio player, a wireless controller of a stationary game console, a laptop computer, a headset, a headphone, a head-mounted display, or a digital still camera and has a wireless communication function.

FIG. 1A illustrates the appearance of the electronic equipment 100. An input area 104 is provided on an enclosure 102 of the electronic equipment 100. The input area 104 can be used as an input interface, and a button, a key, a switch, a slidebar, and so on (hereinafter referred to as buttons) are assigned to the input area 104. It should be noted that it is not necessary to provide the input area 104 in a manner visually identifiable from outside, and that the input area 104 may be visually unidentifiable from outside to ensure that the design of the enclosure 102 is not impaired.

FIG. 1B illustrates the inside of the enclosure 102 of the electronic equipment 100. The electronic equipment 100 has a wireless communication function as described above. Therefore, the electronic equipment 100 includes a wireless communication antenna element (also referred to as a radiation conductor) 10. The antenna element 10 may be a transmission antenna, or a reception antenna, or a transmission/reception antenna. Further, there is no limitation on the wireless communication scheme to be used. The antenna element 10 may be a cellular antenna, a GPS (Global Positioning System) antenna, a wireless LAN (Local Area Network) antenna, a Bluetooth (registered trademark) antenna, a one-segment antenna, a radio antenna, or any other antenna.

As illustrated in FIG. 1B, the antenna element 10 is provided inside the enclosure 102. At least part of the antenna element 10 overlaps the input area 104. The antenna element 10 has its one end, i.e., a power feeding end 12, connected to a wireless section 20. The antenna element 10 has its other end, i.e., an open end 14, left open. Alternatively, the antenna element 10 may be an L-shaped or spiral monopole antenna or a reverse F antenna. The antenna element 10 is not particularly limited in shape or structure. The antenna element 10 makes up part of the input device 200.

FIG. 2 is a block diagram illustrating the electronic equipment 100.

The electronic equipment 100 includes the antenna element 10, the wireless (RF) section 20, a baseband processor 40, an application processor 50, a sound processor 52, an audio output device 54, an audio input device 56, a display device 58, a user interface device 60, and an input detection section 30.

The baseband processor 40 and the application processor 50 integrally control the electronic equipment 100. These processors may be combined into a single chip.

The wireless section 20 uses the antenna element 10 to wirelessly communicate with a base station which is not shown. More specifically, the wireless section 20 modulates a baseband signal output from the baseband processor 40, converting the baseband signal into a high frequency signal and radiating radio waves at a transmission frequency from the antenna element 10. Further, the wireless section 20 demodulates a signal received by the antenna element 10 from the base station, converting it into a baseband signal and outputting the signal to the baseband processor 40. Well-known technologies may be used for the wireless section 20 and the baseband processor 40.

The user interface device 60 includes a touch panel, a keyboard, and ICs (Integrated Circuits) adapted to control the touch panel and the keyboard. The application processor 50 detects user input from the user interface device 60.

The display device 58 includes an LCD (Liquid Crystal Display) or an organic EL (Electro-Luminescence) display and an IC (display driver) adapted to control the LCD or organic EL display. The display device 58 displays image data generated by the application processor 50.

The sound processor 52 controls audio signal inputs and outputs. The sound processor 52 converts an audio signal generated by the application processor 50 into an analog signal and outputs the analog signal to the audio output device 54 such as a speaker or headphones. Further, the sound processor 52 converts an analog audio signal supplied to the audio input device 56 such as a microphone into a digital signal and outputs the digital signal to the application processor 50.

The input detection section 30 detects a user input to the input area 104 based on the change in characteristic of the antenna element 10. In other words, the input device 200 includes the antenna element 10 and the input detection section 30. The user input detection result is supplied to the baseband processor 40. It should be noted that the function of the input detection section 30 may be integrated into the baseband processor 40 or the application processor 50.

The above is the basic configuration of the input device 200 and the electronic equipment 100 having the same. A description will be given next of the detection principle thereof.

The frequency characteristic of the antenna element 10 changes when the user's finger comes into contact with the input area 104 of the electronic equipment 100. This change in frequency characteristic occurs as a result of the formation of a capacitance between the antenna element 10 and the user's finger and the disturbance of impedance matching.

In other words, when the user is not in contact with the input area 104 (also referred to as non-input state), the frequency characteristic of the antenna element 10 is consistent with the design value. More specifically, the resonance frequency of the antenna element 10 in a non-input state agrees with the transmission or reception frequency. Looking at it from a different aspect, the antenna element 10 and the wireless section 20 are matched in impedance.

On the other hand, when the user is in contact with the input area 104 (also referred to as input state), the frequency characteristic of the antenna element 10 falls outside the design value. As a result, the resonance frequency moves from the transmission frequency (or reception frequency $f_{RX}$), resulting in impedance mismatch between the antenna element 10 and the wireless section 20.

In other words, the input detection section 30 detects user input to the input area 104 based on the change in impedance as seen from the wireless section 20 to the antenna element 10.

Figure 3:
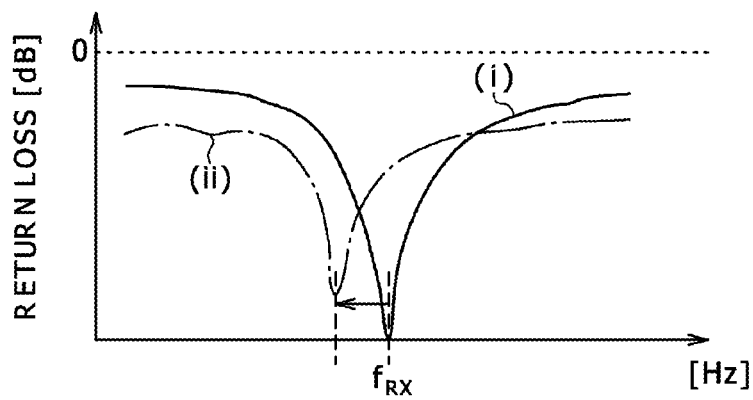
FIG. 3 is a diagram illustrating a frequency characteristic of return loss which is an example of characteristic of an antenna element.

FIG. 3 is a diagram illustrating a frequency characteristic of return loss which is an example of characteristic of the antenna element 10. As illustrated by solid line (i), the antenna element 10 and the wireless section 20 are matched in impedance in a non-input state. Therefore, the return loss as seen from the wireless section 20 to the antenna element 10 takes on the minimum value at the reception frequency $f_{RX}$ (in other words, it can be said that the return loss is large). In an input state, on the other hand, impedance mismatch occurs as illustrated by alternate long and short dashed line (ii). As a result, the resonance frequency at which the return loss takes on the minimum value moves from the reception frequency $f_{RX}$.

The input detection section 30 monitors the frequency characteristic of the antenna element 10 at given intervals (e.g., several tens of Hz), allowing to detect the presence or absence of user input. Although the term "frequency characteristic" will be described in detail later, RSSI (Received Signal Strength Indication) via antenna, antenna reception sensitivity, antenna pass characteristics (S21 and S12 characteristics of S parameters in particular), reflection characteristic (S11 characteristic of S parameters, VSWR: Voltage Standing Wave Ratio or return loss), and so on can be used.

The above is the principle behind the detection of user input by the electronic equipment 100.

A description will be given next of a specific configuration of and process performed by the electronic equipment 100 based on several embodiments.

In a first embodiment, a description will be given of the electronic equipment 100 which detects user input by using a reception (or transmission/reception) antenna and a reception portion of the wireless section 20.

In a second embodiment, a description will be given of the electronic equipment 100 which detects user input by using a transmission (or transmission/reception) antenna and a transmission portion of the wireless section 20.

First Embodiment

Figure 4:
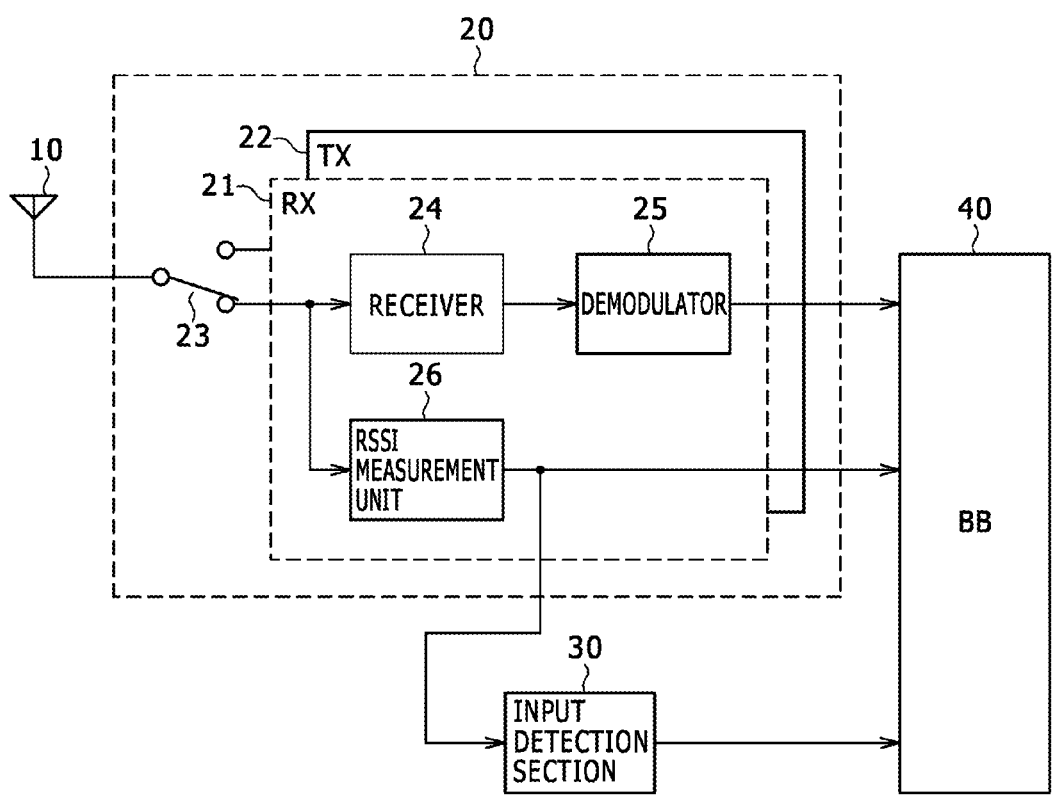
FIG. 4 is a block diagram illustrating electronic equipment according to a first embodiment.

FIG. 4 is a block diagram illustrating electronic equipment 100a according to the first embodiment.

The electronic equipment 100a uses RSSI as a frequency characteristic of the antenna element 10. The wireless section 20 includes a reception portion 21, a transmission portion 22, and an antenna switch 23. The reception portion 21 and the transmission portion 22 are connected to the antenna element 10 by the antenna switch 23 in a time-divided manner. It should be noted that a duplexer may be used in place of the antenna switch 23.

The reception portion 21 includes a receiver 24, a demodulator 25, and a received signal strength indication measurement unit 26. The receiver 24 includes an LNA (Low-Noise Amplifier), a Gilbert cell mixer, and other circuits and amplifies a very weak signal received by the antenna element 10, converting the signal into a local frequency. The demodulator 25 demodulates the signal received by the receiver 24.

In the first embodiment, RSSI is used as a frequency characteristic of the antenna element 10 to determine the presence or absence of user input.

The received signal strength indication measurement unit 26 measures the strength (i.e., RSSI) of a signal received by the antenna element 10. Many pieces of electronic equipment having a wireless communication function often incorporate a received signal strength measurement function to achieve diversity control or MIMO (Multiple Input Multiple Output) control. The electronic equipment 100a can divert this function to detecting input. A well-known technology may be used for the received signal strength indication measurement unit 26.

In other words, assuming that the strength of radio waves received by the antenna element 10 from the base station is constant, the antenna gain is high at the reception frequency in a non-input state with no user input. Therefore, the RSSI is large. In a user input state, on the other hand, the antenna gain declines at the reception frequency, resulting in lower RSSI. Therefore, the electronic equipment 100a illustrated in FIG. 4 can detect the presence or absence of user input by referring to the RSSI.

Here, the electronic equipment 100a is not necessarily used in a good wireless environment. In other words, if RSSI is referred to, it may be difficult to determine whether a decline in RSSI is caused by user input or by a decline in strength of radio waves from the base station. This problem is solved by the algorithm given below.

This algorithm is effective when the electronic equipment 100a has the plurality of antenna elements 10. Here, the received signal strength indication measurement unit 26 measures the RSSI for each of the plurality of antenna elements 10. The input detection section 30 detects user input to the input area 104 based on the relative relationship between RSSIs measured for the plurality of antenna elements 10.

In order to facilitate understanding, we consider a case in which the two antenna elements 10 (hereinafter referred to as first and second antennas) are both used for wireless communication and as input buttons. In other words, the electronic equipment 100a includes the plurality of input areas (hereinafter referred to as the first and second input areas) 104. The presence or absence of user input is determined for each of the input areas 104.

Figure 5:
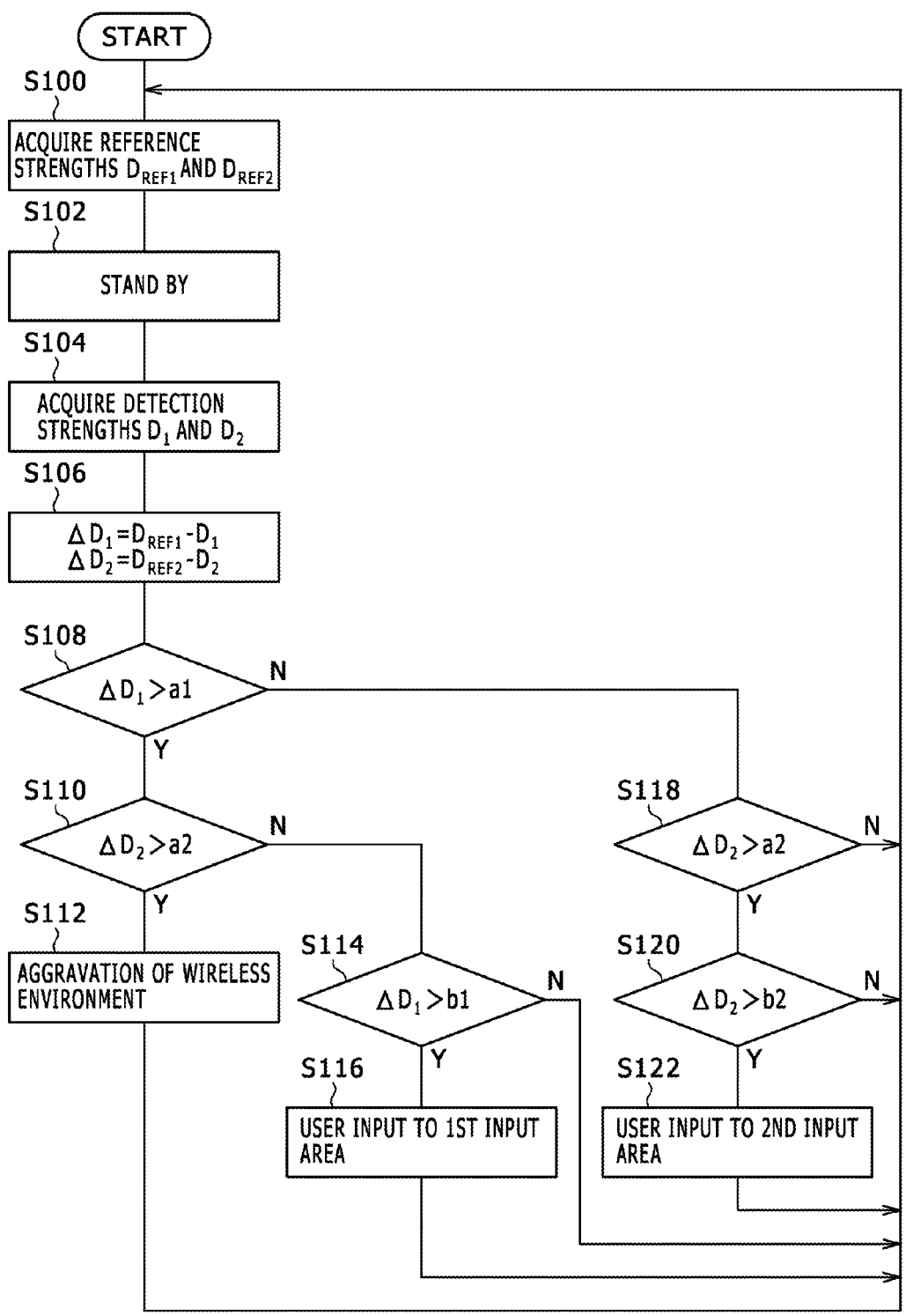
FIG. 5 is a flowchart adapted to determine input based on a first algorithm.

FIG. 5 is a flowchart adapted to determine input based on a first algorithm.

The input detection section 30 repeats the process described below at given intervals.

First, the received signal strength indication measurement unit 26 acquires the RSSIs of the first and second antennas. These RSSIs are stored in a memory as first and second reference strengths $D_{REF1}$ and $D_{REF2}$ (S100). Shortly after that (S102), the received signal strength indication measurement unit 26 acquires the current RSSIs of the first and second antennas (S104). These RSSIs are stored in the memory as first and second detected strengths $D_1$ and $D_2$. We assume that the larger the RSSIs are, the larger the values of the strengths $D_{REF1}$, $D_{REF2}$, $D_1$, and $D_2$ become.

Next, the input detection section 30 calculates a difference $\Delta D_1$ between the first detected strength $D_1$ and the first reference strength $D_{REF1}$ and a difference $\Delta D_2$ between the second detected strength $D_2$ and the second reference strength $D_{REF2}$ (S106).

$$\Delta D_1 = D_{REF1} - D_1$$

$$\Delta D_2 = D_{REF2} - D_2$$

The difference $\Delta D_1$ represents the change in strength from the reference state.

Then, when the difference $\Delta D_1$ is larger than a predetermined threshold a1 (Y in S108), and when the difference $\Delta D_2$ is larger than a threshold a2 (Y in S110), in other words, if the RSSIs of the first and second antennas decline, it is determined irrespective of user input that the wireless environment has aggravated (S112), and control returns to step S100.

On the other hand, when the difference $\Delta D_2$ is larger than the threshold a1 (Y in S108), and when the difference $\Delta D_2$ is smaller than the threshold a2 (N in S110), in other words, when the RSSI of only the first antenna declines, but the RSSI of the second antenna does not substantially do so, there is a likelihood that user input may have been made to the first input area. The input detection section 30 compares the difference $\Delta D_2$ against a threshold b1 which is used to determine button input. When the difference $\Delta D_2$ is larger than the threshold b1 (Y in S114), the input detection section 30 determines that user input has been made to the first input area (S116). When the difference $\Delta D_2$ is smaller than the threshold b1 (N in S114), the input detection section 30 determines that no user input has been made to the first input area, and control returns to step S100.

On the other hand, when the difference $\Delta D_2$ is smaller than the threshold a1 (N in S108), and when the difference $\Delta D_2$ is larger than the threshold a2 (Y in S118), in other words, when the RSSI of only the second antenna declines, but the RSSI of the first antenna does not substantially do so, there is a likelihood that user input may have been made to the second input area. The input detection section 30 compares the difference $\Delta D_2$ against a threshold b2 which is used to determine button input. When the difference $\Delta D_2$ is larger than the threshold b2 (Y in S120), the input detection section 30 determines that user input has been made to the second input area (S122). When the difference $\Delta D_2$ is smaller than the threshold b2 (N in S120), the input detection section 30 determines that no user input has been made to the second input area, and control returns to step S100.

When the difference $\Delta D_1$ is smaller than the threshold a1 (N in S108), and the difference $\Delta D_2$ is smaller than the threshold a2 (N in S118), the input detection section 30 determines that the wireless environment is good, and that no user input has been made, and control returns to step S100.

The above is the determination flow.

Thus, the input detection section 30 detects user input to the plurality of input areas based on the relative relationship between the received signal strength indications (RSSIs) of the plurality of antenna elements. This prevents erroneous detection of user input in a poor wireless environment.

As for the acquisition of the reference strengths $D_{REF1}$ and $D_{REF2}$ in step S100 of the flowchart illustrated in FIG. 5, the strengths acquired from moment to moment may be used in an "as-is" manner. Alternatively, moving averages of the strengths over a given period of time may be calculated. Still alternatively, the strengths may be filtered.

Further, diversity control described below may be performed for the plurality of antennas in parallel with the flowchart illustrated in FIG. 5.

A predetermined one of the plurality of antennas (e.g., first antenna) is defined to be used in preference to the other antenna. In a normal state in which the radio wave condition is good with no user input, the first antenna ANT1 is used. If the radio wave environment of the first antenna ANT1 aggravates, and, as a result, the radio wave environment of the second antenna ANT2 is better, the second antenna ANT2 is used.

If the RSSIs of the first and second antennas decline in the flowchart illustrated in FIG. 5, it is determined irrespective of user input that the wireless environment has deteriorated (S112). Also in this case, the first antenna ANT1 is used.

If it is determined that user input has been made to the first input area (first antenna ANT1) (S116) in the flowchart illustrated in FIG. 5, the second antenna ANT2 free from user input is used.

If it is determined that user input has been made to the second input area (second antenna ANT2) (S122) in the flowchart illustrated in FIG. 5, the first antenna ANT1 free from user input is used.

Up to this point, a description has been given of a case in which an antenna element overlaps an input area, in other words, a case in which an antenna element functions as a button or switch. However, it is possible to assign a plurality of button or switch functions to an antenna element.

Figure 6:
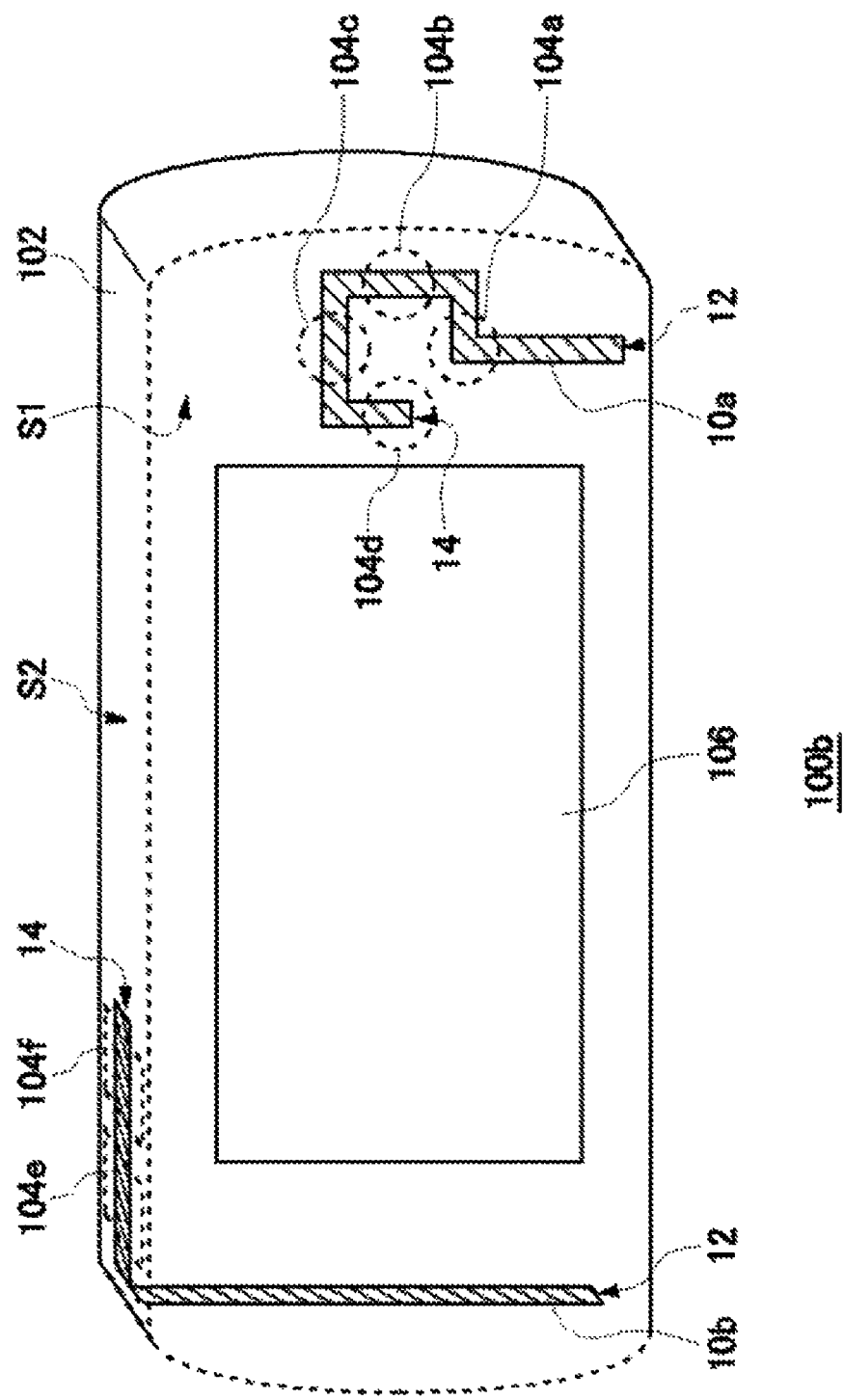
FIG. 6 is a diagram illustrating electronic equipment in which a plurality of button functions are assigned to a single antenna element.
Figure 7A:
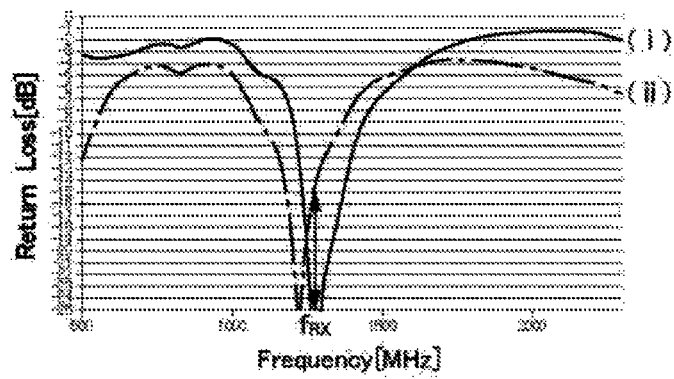
FIGS. 7A to 7D are diagrams illustrating measured values for frequency characteristic of return loss of a first antenna element when a plurality of input areas are touched.
Figure 7B:
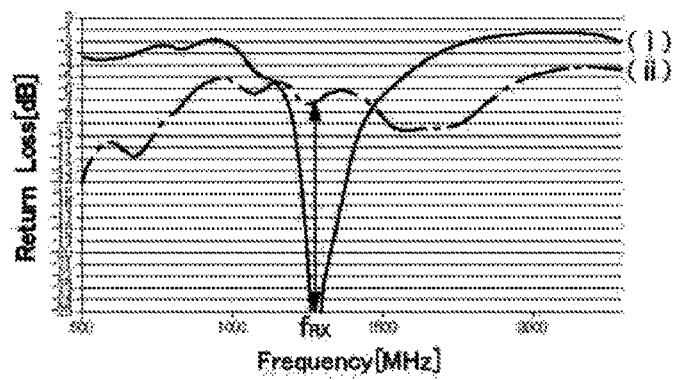
Figure 7C:
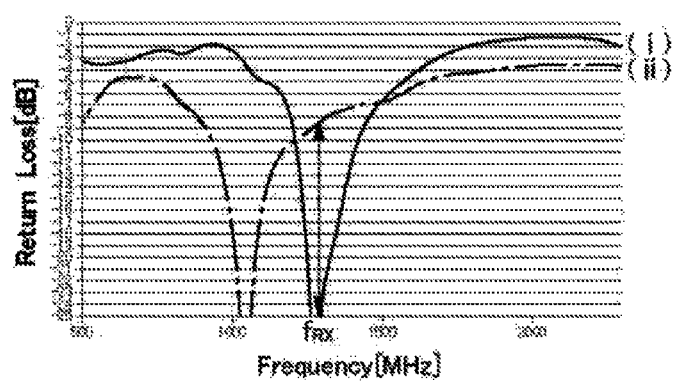
Figure 7D:
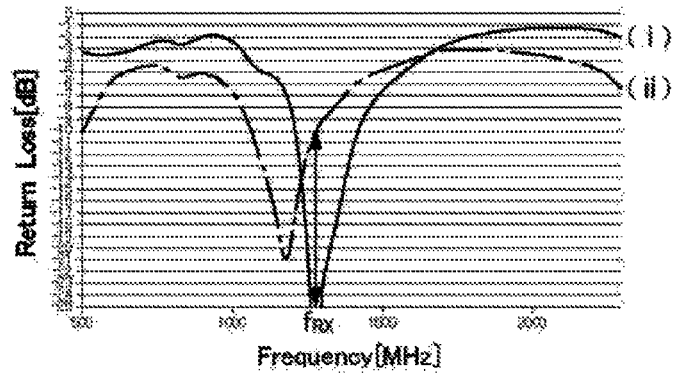

FIG. 6 is a diagram illustrating electronic equipment 100$b$ in which a plurality of button functions are assigned to a single antenna element. The electronic equipment 100$b$ includes two antenna elements 10$a$ and 10$b$.

A display panel 106 of the enclosure 102 is provided on a front face S1. A plurality of (four in this case) input areas 104$a$ to 104$d$ are provided in the area of the front face S1 adjacent to the display panel 106. Each of the input areas 104$a$ to 104$d$ is associated with a separate button. For example, the input areas 104$a$ to 104$d$ are arranged in the shape of a cross.

The first antenna element 10$a$ is formed in such a manner as to overlap the four input areas 104$a$ to 104$d$ that are assigned to the first antenna element 10$a$.

Further, a plurality of (two in this case) input areas 104$e$ and 104$f$ are provided in the area of a side face S2 that can be touched by the user's left index finger. The side face S2 is a face different from the front face S1 on which the display panel 106 of the enclosure 102 is provided. Each of the input areas 104$e$ and 104$f$ is also associated with a separate button.

The second antenna element 10$b$ is formed in such a manner as to overlap the two input areas 104$e$ and 104$f$ that are assigned to the second antenna element 10$b$.

FIGS. 7A to 7D are diagrams illustrating measured values for frequency characteristic of return loss of the first antenna 10$a$ when the plurality of input areas 104$a$ to 104$d$ are touched. (i) represents a non-input state, and (ii) an input state. As is clear from FIGS. 7A to 7D, the frequency characteristic of return loss changes in accordance with the position touched by the user.

In this example, the return loss at a reception frequency $f_{RX}$ is −15 dB when the input area 104$a$ is touched, −7 dB when the input area 104$b$ is touched, −8.5 dB when the input area 104$c$ is touched, and −10 dB when the input area 104$d$ is touched. In other words, if radio waves are received in the same wireless environment, the RSSI value changes with change in return loss.

Therefore, it is possible to determine, based on RSSI, which of the input areas 104$a$ to 104$d$ has been touched by acquiring, in advance, return loss values at the reception frequency $f_{RX}$ in the four states when the input areas 104$a$ to 104$d$ are touched.

If a plurality of buttons are assigned to the single antenna element 10, it is only necessary to modify the flowchart illustrated in FIG. 5 in the following manner.

As many thresholds b1 in step S114 are made available as the number of buttons assigned to the first antenna element 10$a$. That is, in the configuration illustrated in FIG. 6, four thresholds b1a to b1d are made available as the threshold b1. This makes it possible to determine, based on the results of comparison between each of the thresholds b1a to b1d and the difference $\Delta D_1$, to which of the input areas user input has been made.

As many thresholds b2 in step S120 are made available as the number of buttons assigned to the second antenna element 10$b$. That is, in the configuration illustrated in FIG. 6, two thresholds b2e and b2f are made available as the threshold b2. This makes it possible to determine, based on the results of comparison between each of the thresholds b2e and b2f and the difference $\Delta D_2$, to which of the input areas user input has been made.

FIG. 8 is a diagram illustrating correspondence between RSSIs of the electronic equipment 100 having two antennas and determination results for diversity control and user input. In this example, we assume that two areas (buttons) w and x are assigned to the first antenna ANT1, and two areas (buttons) y and z are assigned to the second antenna ANT2.

In state 1, the RSSIs of the two antennas ANT1 and ANT2 are standard values (100). As a result, the antenna ANT1 is used in preference for communication. In state 2, the antenna ANT1 improves in sensitivity. As a result, the antenna ANT1 is used in preference for communication. In state 3, the antenna ANT2 improves in sensitivity. As a result, the antenna ANT2 is used in preference for communication.

In state 4, the two antennas ANT1 and ANT2 decline in RSSI. This corresponds to Y in step S110 in the flowchart illustrated in FIG. 5. It is determined that these declines are caused by aggravation of the wireless environment in step S112. In state 5, the two antennas ANT1 and ANT2 decline further in RSSI. In this case, it is similarly determined that the declines are caused by aggravation of the wireless environment in step S112.

In states 6 and 7, only the antenna ANT1 declines in RSSI. This corresponds to Y in step S114 in the flowchart illustrated in FIG. 5. It is determined that user input has been made to the input area assigned to the antenna ANT1. It is determined, based on the decline in RSSI of the antenna ANT1, to which of the buttons w and x user input has been made.

In states 8 and 9, only the antenna ANT2 declines in RSSI. This corresponds to Y in step S118 in the flowchart illustrated in FIG. 5. It is determined that user input has been made to the input area assigned to the antenna ANT2. It is determined, based on the decline in RSSI of the antenna ANT2, to which of the buttons y and z user input has been made.

In states 10 and 11, the antennas ANT1 and ANT2 decline in RSSI. This is highly probably caused by the deterioration of the wireless environment, and the reference strengths $D_{REF1}$ and $D_{REF2}$ illustrated in FIG. 5 also decline. In states 10 and 11, the antenna ANT1 declines more in RSSI. As a result, $\Delta D_2$ is extremely small, and only $\Delta D_2$ is large. This corresponds to Y in step S114 in the flowchart illustrated in FIG. 5. It is determined that user input has been made to the input area assigned to the antenna ANT1. It is determined, based on the decline in RSSI of the antenna ANT1, to which of the buttons w and x user input has been made.

In states 12 and 13, the antennas ANT1 and ANT2 decline in RSSI. This is highly probably caused by the deterioration of the wireless environment, and the reference strengths $D_{REF1}$ and $D_{REF2}$ illustrated in FIG. 5 also decline. In states 12 and 13, the antenna ANT2 declines more in RSSI. As a result, $\Delta D_2$ is extremely small, and only $\Delta D_2$ is large. This corresponds to Y in step S120 in the flowchart illustrated in FIG. 5. It is determined that user input has been made to the input area assigned to the antenna ANT2. It is determined, based on the decline in RSSI of the antenna ANT2, to which of the buttons y and z user input has been made.

The first embodiment has been described above.

The present electronic equipment 100 allows for detection of user input where the antenna element 10 is arranged, thus eliminating the need for mechanical buttons and touch panel that have been hitherto necessary.

A somewhat wide surface is necessary for mechanical buttons and touch panel. In contrast, a space for arranging the antenna element 10 is enough for the input interface using the antenna element 10, making it possible to arrange buttons in a narrow area. Further, mechanical buttons and touch panel are restricted in that they can only be provided on a level surface. In contrast, the antenna element 10 can be three-dimensionally formed into a desired shape, making it possible to arrange buttons along a curved surface of the enclosure 102. In other words, it is possible to significantly enhance the degree of freedom in design or function of the electronic equipment 100.

It is difficult to avoid forming mechanical buttons and touch panel in a manner identifiable in appearance. In contrast, the input device according to the embodiment can be formed in a manner unidentifiable in appearance. This reduces restrictions in designing the electronic equipment 100.

Further, water resistance and water tightness present a problem for mechanical buttons. On the other hand, the antenna element 10 can be formed inside the sealed enclosure 102, providing enhanced water resistance and water tightness. Still further, the input device 200 according to the embodiment has no movable sections unlike mechanical buttons, making the input device 200 superior in terms of durability and service life as well.

Still further, if RSSIs are used to detect user input as in the case of the first embodiment, existing hardware can be diverted, cutting down the increase in cost and circuit area for forming the input device 200 according to the embodiment.

Modification Example of First Embodiment

The position of resonance frequency moves in accordance with the presence or absence of user input or the position touched by the user as illustrated in FIGS. 7A to 7D. For this reason, the input detection section 30 may measure the resonance frequency of the antenna element 10 instead of or in addition to monitoring the RSSIs. This also allows to detect user input.

Alternatively, the electronic equipment 100 may, on its own, generate a pilot signal at the same frequency as the reception frequency $f_{RX}$ and measure the RSSI for the pilot signal to detect user input in a hostile wireless environment. Still alternatively, if the electronic equipment 100 is a controller of a stationary game console, the main body of the game console may transmit a pilot signal in a hostile wireless environment.

Second Embodiment

Figure 9:
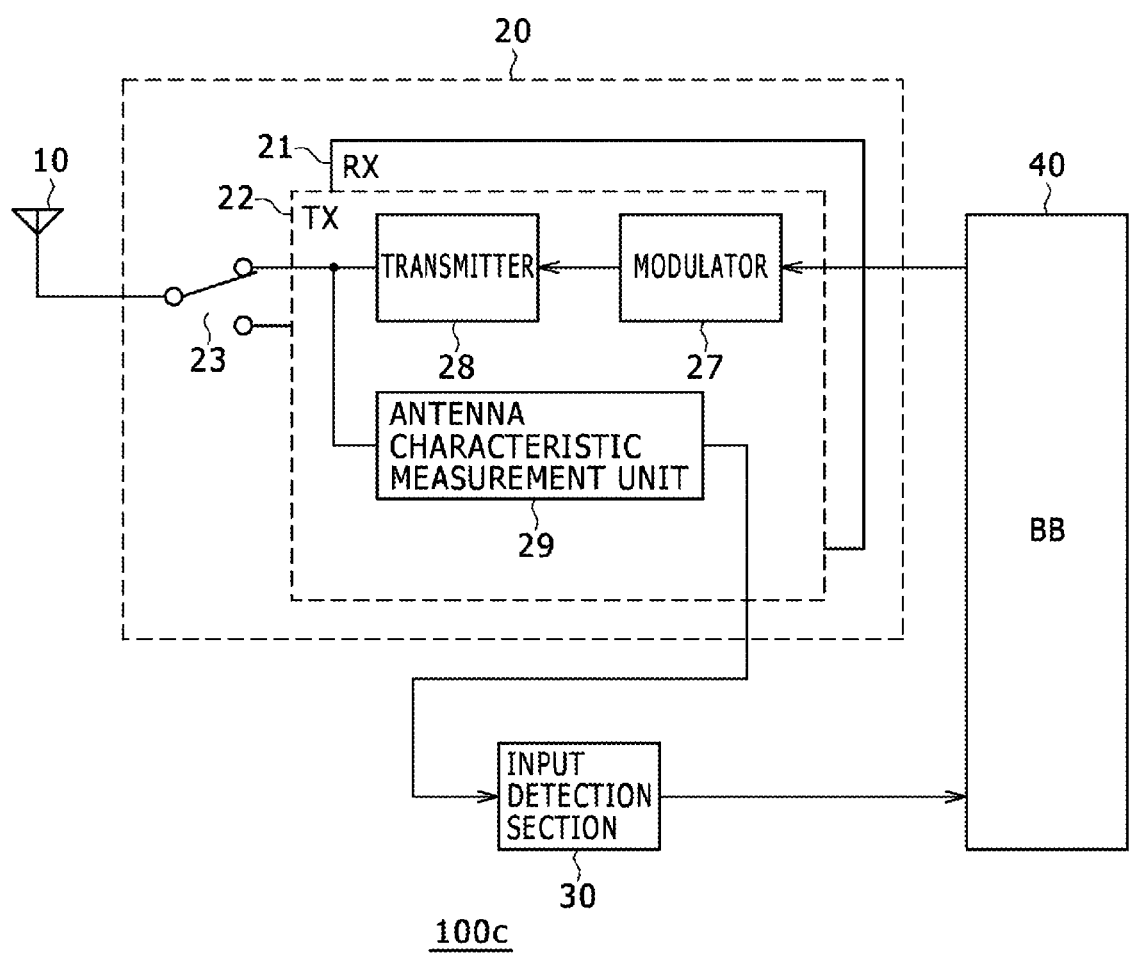
FIG. 9 is a block diagram illustrating electronic equipment according to a second embodiment.

FIG. 9 is a block diagram illustrating electronic equipment 100c according to a second embodiment. In the second embodiment, user input is detected using the transmission (or transmission/reception) antenna 10 and the transmission portion 22 of the wireless section 20.

The transmission portion 22 includes a modulator 27, a transmitter 28, and an antenna characteristic measurement unit 29. The modulator 27 modulates a baseband signal from the baseband processor 40. The transmitter 28 converts the frequency of the signal from the modulator 27, amplifies the resultant signal, and outputs the amplified signal to the antenna element 10 via the antenna switch 23, allowing the antenna element 10 to radiate radio waves at a transmission frequency $f_{TX}$.

The frequency characteristic of the transmission antenna element 10 also changes as does the reception antenna when touched by the user. For this reason, the antenna characteristic measurement unit 29 measures the characteristic of the antenna element 10, and more specifically, the reflection characteristic thereof.

For example, the antenna characteristic measurement unit 29 acquires the return loss of the antenna element 10 at the transmission frequency $f_{TX}$. When the antenna element 10 and the reception portion 21 are matched in impedance, in other words, in a non-input state, the reflection is zero. As a result, the return loss is substantially large (−∞dB). Therefore, power transmitted by the transmitter 28 to the antenna element 10 is successfully transmitted to the antenna element 10 with nearly no reflection. In a user input state, on the other hand, power transmitted by the transmitter 28 to the antenna element 10 is reflected back to the transmitter 28 due to impedance mismatch. Because the amount of power output by the transmitter 28 to the antenna element 10 is known, it is possible to measure the return loss at the transmission frequency $f_{TX}$ by measuring power reflected by the antenna element 10. The antenna characteristic measurement unit 29 detects the presence or absence of user input based on the measured return loss.

The above is the configuration of the electronic equipment 100c according to the second embodiment.

This electronic equipment 100c provides the same advantages as those in the first embodiment.

In addition, the electronic equipment 100c according to the second embodiment offers the following advantages. In the first embodiment, if the antenna characteristic is measured using radio waves from a base station, it is difficult to detect user input when the electronic equipment is outside the wireless range. In contrast, in the second embodiment, the characteristic of the antenna element 10 is measured based on the signal generated by the electronic equipment 100c on its own, allowing for detection of user input without relying on the wireless environment.

Modification Example of Second Embodiment

The antenna characteristic measurement unit 29 may measure VSWR (Voltage Standing Wave Ratio), reflection coefficient (S11 of S parameters), or antenna efficiency. Alternatively, if the wireless section 20 has an auto-tuner adapted to adjust the impedance matching, the input detection section 30 may measure the characteristic of the antenna element 10 by referring to the variable controlled by the auto-tuner.

The present disclosure has been described above based on several embodiments. It should be understood by those skilled in the art that these embodiments are illustrative and the combination of their elements and processes can be modified in various ways, and that these modification examples also fall within the scope of the present disclosure. A description will be given below of such modification examples.

First Modification Example

In the first and second embodiments, cases have been described in which an input area is used as a separate button. However, the present disclosure is not limited thereto. Instead, for example, it is possible for an input area to have the same function as a touch pad, namely, a coordinate detection function.

The single input area 104 is associated with the antenna element 10 illustrated in FIG. 1B. As described with reference to FIGS. 7A to 7D, the characteristic of the antenna element 10 changes in accordance with the coordinates touched by the user. For this reason, it is possible to identify the coordinates touched by the user by measuring the change in characteristic of the antenna element 10 with the input detection section 30. This means that an input area can be treated as a one- or two-dimensional touch pad.

Second Modification Example

The input detection section 30 can also detect gesture input by monitoring a temporal waveform of change in characteristic of the antenna element 10. For example, if the user's finger slides over the input area 104 of the electronic equipment 100 illustrated in FIG. 1B in a first direction, the RSSI increases or will increase monotonically. This makes it possible to detect slide input and flick input based on RSSI waveform.

Third Modification Example

The electronic equipment according to the first embodiment and that according to the second embodiment may be combined. That is, the detection accuracy can be enhanced by measuring the characteristic of the antenna element 10 both on the transmitter and receiver sides.

Fourth Modification Example

FIGS. 10A to 10E are diagrams illustrating modification examples of the electronic equipment 100. Electronic equipment 100d illustrated in FIG. 10A is a mobile phone terminal or a tablet PC (Personal Computer). A plurality of buttons are provided adjacent to the display panel 106. The plurality of buttons include (i) a home button B1, (ii) a back button B2, and (iii) a menu screen button B3. The home button B1 is pressed to access the home screen and home page. The back button B2 is pressed to return to the previous screen or menu, or to cancel the immediately previous operation. The menu screen button B3 is pressed to display a specific menu screen. The input areas 104a to 104c are associated respectively with the buttons B1 to B3. The antenna element 10 is formed to cross the three areas 104a to 104c.

Electronic equipment 100e illustrated in FIG. 10B is also a mobile phone terminal or a tablet PC. Input areas 104 are provided on edge portions of the enclosure 102 thereof. The antenna element 10 is formed to overlap the input areas 104. The input area 104a is located where it is readily accessible by the thumb when the enclosure 102 is held with the left hand. The input area 104b is located where it is readily accessible by the index finger. These input areas 104a and 104b can be assigned to the volume button, the power button, the home button, the back button, the menu button, and so on.

Electronic equipment 100f illustrated in FIG. 10C is a portable game terminal. The game terminal includes a directional key pad (arrow key pad) 110 located adjacent to the display panel 106 and operated by the left thumb, a plurality of control buttons (control keys) B1 to B4 operated by the right thumb, a control key B5 operated by the left index finger or middle finger, a control key B6 operated by the right index finger or middle finger, and so on. Any one or the plurality of these keys may be formed with the input device using the antenna element 10 in place of mechanical buttons.

Electronic equipment 100g illustrated in FIG. 10D is a wireless controller of a stationary game terminal. The controller includes the directional key pad (arrow key pad) 110 operated by the left thumb, the plurality of control buttons (control keys) B1 to B4 operated by the right thumb, the control key B5 operated by the left index finger or middle finger, the control key B6 operated by the right index finger or middle finger, a start button B7, a select button B8, and so on. Any one or the plurality of these keys may be formed with the input device using the antenna element 10 in place of mechanical buttons.

Electronic equipment 100h illustrated in FIG. 10E is a laptop computer. The input areas 104a and 104b are provided on side edges of the upper enclosure (upper cover) where the display panel 106 is provided. Input operations using the input areas 104a and 104b are defined in the OS (Operating System), utility software, or application software executed on the computer. For example, the action of sliding a finger over the input area 104a can be assigned to scrolling. Further, user authentication is possible using the input areas 104a and 104b. Still further, an arbitrary input operation can be assigned to the input areas 104a and 104b by the user.

Figure 11A:
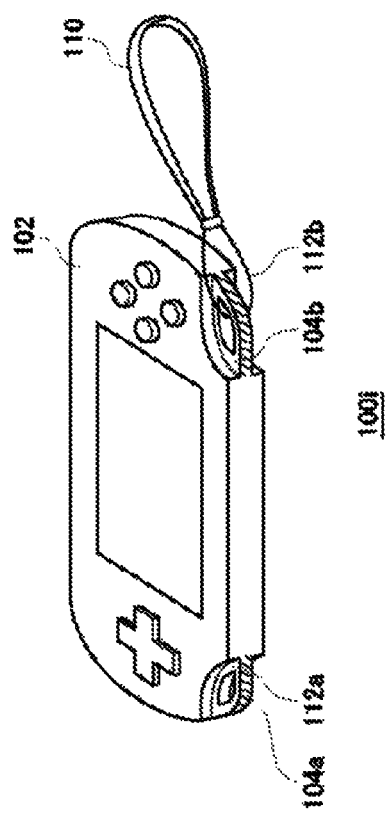
FIGS. 11A to 11D are diagrams illustrating other modification examples of the electronic equipment.

FIGS. 11A to 11D are diagrams illustrating other modification examples of the electronic equipment 100. The electronic equipment illustrated in FIG. 11A is, for example, a portable game console 100i. Strap attachment sections 112a and 112b are provided on the enclosure 102 of the portable game console 100i to wrap a strap 110. The input areas 104a and 104b are formed respectively along curved surfaces of the strap attachment sections 112a and 112b. The input areas 104a and 104b can be used as a power button, a scroll button, and so on.

Figure 11B:
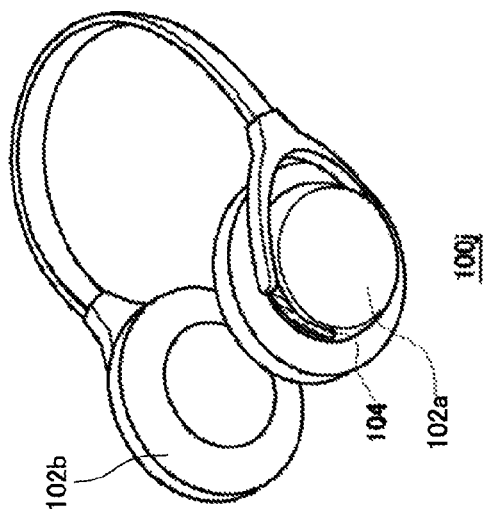

The electronic equipment illustrated in FIG. 11B is wireless headphones 100j. The wireless headphones 100j include enclosures 102a and 102b that cover the left and right ears, respectively. Each of the enclosures 102a and 102b incorporates a wireless section and an audio amplifier that are not shown. The input area 104 is formed along a curved surface of each of the enclosures 102a and 102b. Each of the input areas 104 can be used as a power button, volume button, a mute button, and so on.

Figure 11C:
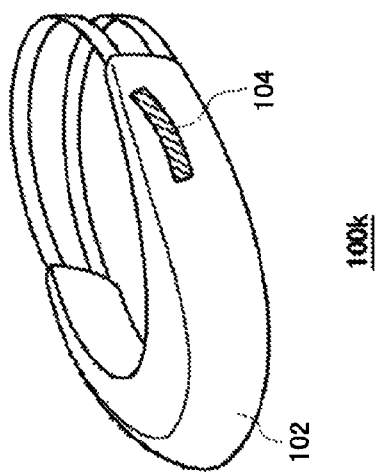

The electronic equipment illustrated in FIG. 11C is a head-mounted display (HMD) 100k. The enclosure 102 incorporates a wireless section, a display device, an image processing IC, and so on that are not shown. The input area 104 is formed along a curved surface of the enclosure 102. The input area 104 can be used as a power button, a volume button, a mute button, a dioptric adjustment button, an image quality adjustment button, and so on.

Figure 11D:
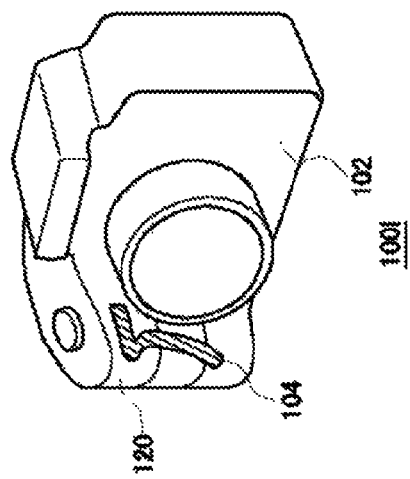

The electronic equipment illustrated in FIG. 11D is a digital still camera 100l. A grip 120 is provided on the enclosure 102. For example, the input area 104 is formed along the grip 120. A dial is provided on the ordinary digital still camera 100l to adjust the exposure, shutter speed, and aperture or manipulate a menu screen. For example, some of the functions of this dial can be assigned to the input area 104.

The antenna element 10 can be formed into an arbitrary three-dimensional shape as illustrated in FIGS. 11A to 11D. This makes it easy to arrange buttons along the curved surface of the enclosure 102, thus providing significantly enhanced degree of freedom in design or function of the electronic equipment 100.

In addition to the above, the input device 200 according to the embodiment can be incorporated in a variety of compact pieces of equipment and wearable devices.

Fifth Modification Example

Unlike a physical key, it is difficult for the user to verify whether the input device using the antenna element 10 according to the embodiment has been pressed. For this reason, the electronic equipment 100 may notify the user with a beep or vibration upon detection of user input. Alternatively, the electronic equipment 100 may display icons defined to be associated with user operation inputs or button functions on the display panel 106. Still alternatively, if the antenna element 10 is used for text input, text entered by the user may be displayed on the display panel 106.

The present disclosure has been described based on the embodiments. It should be understood by those skilled in the art that these embodiments are illustrative and the combination of their elements and processes can be modified in various ways, and that these modification examples also fall within the scope of the present disclosure.

The present application contains subject matter related to that disclosed in Japanese Priority Patent Application JP 2013-169839 filed in the Japan Patent Office on Aug. 19, 2013, the entire content of which is hereby incorporated by reference.

What is claimed is:

1. Electronic equipment having a wireless communication function, the electronic equipment comprising:
an antenna element, including conductive structure for transmitting and receiving electromagnetic signals that carry data over a wireless communication channel, the antenna element arranged in such a manner that: (i) at least part of the antenna element overlaps a plurality input areas used as an input interface on an enclosure of the electronic equipment, where the antenna includes a plurality of sections therealong, (ii) each of the plurality of sections corresponding to a respective one of the plurality of input areas of the input interface, and (iii) the conductive structure of the antenna element is of substantially uniform width along the respective plurality of input areas of the input interface, such that at least a first plurality of input areas exist along a respective straight, substantially uniform width section of the conductive structure of the antenna element;
a wireless section adapted to perform wireless communication using the antenna element; and
an input detection section adapted to detect on which of the respective input areas user input is made based on a state of the antenna element, where detection along the respective straight, substantially uniform width section of the conductive structure of the antenna element includes detection of a user input corresponding to an operation, on a particular one of the at least first plurality of input areas along the respective straight, substantially uniform width section of the conductive structure of the antenna element, different from detection of another user input corresponding to another operation, on another particular one of the at least first plurality of input areas along the respective straight, substantially uniform width section of the conductive structure of the antenna element.

2. The electronic equipment of claim 1, wherein:
the wireless section includes a received signal strength indication measurement unit adapted to measure a strength of a signal received by the antenna element, and
the input detection section detects the user input based on the strength.

3. The electronic equipment of claim 1, wherein
the wireless section includes a transmission portion adapted to radiate radio waves at a transmission frequency to the antenna element, and
the input detection section includes a reflection characteristic detection unit adapted to measure a reflection characteristic of the antenna element at the transmission frequency and detects the user input based on the amount of reflection.

4. The electronic equipment of claim 1, wherein each of the plurality of input areas corresponds to a predetermined function of the electronic equipment such that when the input detection section determines that user input has been made to any of the input areas, an indication that the corresponding function is to be activated by the electronic equipment is determined.

5. The electronic equipment of claim 1, wherein the input detection section determines coordinates of the antenna element touched by the user based on the change in characteristic of the antenna element.

6. The electronic equipment of claim 1, further comprising:
a plurality of antenna elements, among which the antenna element is one,
the wireless section achieves wireless communication using the plurality of antenna elements,
the plurality of antenna elements are arranged such that at least a further antenna element among the plurality of antenna elements overlaps at least one further input area, and
the input detection section detects the user input to the plurality of input areas and the at least one further input area.

7. The electronic equipment of claim 6, wherein
the wireless section includes a received signal strength indication measurement unit adapted to measure the strength of a signal received by each of the plurality of antenna elements, and
the input detection section detects the user input to the plurality of input areas and the at least one further input area based on the relative relationship between strengths measured for the plurality of antenna elements.

8. The electronic equipment of claim 1 being a mobile phone terminal, wherein the plurality of input areas are provided on a front face of the enclosure, adjacent to a liquid crystal display.

9. An input device incorporated in electronic equipment having a wireless communication function, the input device comprising:
a communication antenna element, including conductive structure for transmitting and receiving electromagnetic signals that carry data over a wireless communication channel, the antenna element arranged in such a manner that: (i) at least part of the antenna element overlaps a plurality input areas used as an input interface on an enclosure of the electronic equipment, where the antenna includes a plurality of sections therealong, (ii) each of the plurality of sections corresponding to a respective one of the plurality of input areas of the input interface, and (iii) the conductive structure of the antenna element is of substantially uniform width along the respective plurality of input areas of the input interface, such that at least a first plurality of input areas exist along a respective straight, substantially uniform width section of the conductive structure of the antenna element; and
an input detection section adapted to detect on which of the respective input areas user input is made based on a state of the antenna element, where detection along the respective straight, substantially uniform width section of the conductive structure of the antenna element includes detection of a user input corresponding to an operation, on a particular one of the at least first plurality of input areas along the respective straight, substantially uniform width section of the conductive structure of the antenna element, different from detection of another user input corresponding to another operation, on another particular one of the at least first plurality of input areas along the respective straight, substantially uniform width section of the conductive structure of the antenna element.

10. A user touch input detection method in electronic equipment having a wireless communication function, the user touch input detection method comprising:
arranging a communication antenna element, including conductive structure for transmitting and receiving electromagnetic signals that carry data over a wireless communication channel, the antenna element arranged in such a manner that: (i) at least part of the antenna element overlaps a plurality input areas used as an input interface on an enclosure of the electronic equipment, where the antenna includes a plurality of sections therealong, (ii) each of the plurality of sections corresponding to a respective one of the plurality of input areas of the input interface, and (iii) the conductive structure of the antenna element is of substantially uniform width along the respective plurality of input areas of the input interface, such that at least a first plurality of input areas exist along a respective straight, substantially uniform width section of the conductive structure of the antenna element;
monitoring an impedance of the antenna element as seen from a wireless section connected to the antenna element; and
detecting which of the respective input areas receive user input based on the change in the impedance, where detection along the respective straight, substantially uniform width section of the conductive structure of the antenna element includes detection of a user input corresponding to an operation, on a particular one of the at least first plurality of input areas along the respective straight, substantially uniform width section of the conductive structure of the antenna element, different from detection of another user input corresponding to another operation, on another particular one of the at least first plurality of input areas along the respective straight, substantially uniform width section of the conductive structure of the antenna element.

* * * * *